Aug. 17, 1971  A. GIRANTET ET AL  3,600,137
APPARATUS FOR THE CONTINUOUS PREPARATION OF
PHTHALATE ESTERS OF GLYCOLS
Filed May 14, 1969  4 Sheets-Sheet 1

FIG.1.

Inventors
Antoine Girantet
Jean Roget
Philippe Tarbouriech
By Cushman, Darby & Cushman
Attorneys

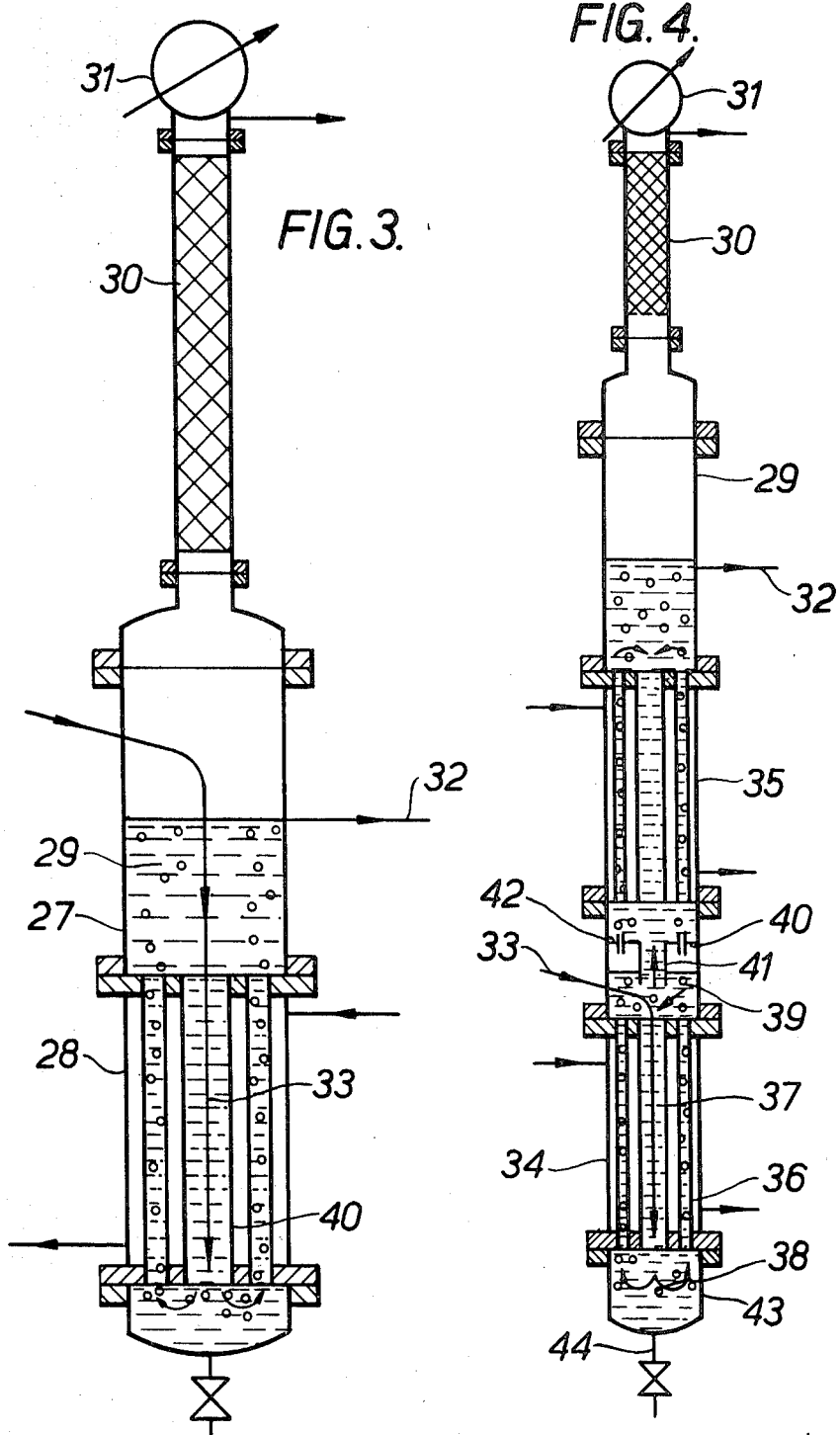

Aug. 17, 1971 A. GIRANTET ET AL 3,600,137
APPARATUS FOR THE CONTINUOUS PREPARATION OF
PHTHALATE ESTERS OF GLYCOLS
Filed May 14, 1969 4 Sheets-Sheet 4

Inventors
Antoine Girantet
Jean Roget
Philippe Tarbouriech
By Cushman, Darby & Cushman
Attorneys United States Patent Office 3,600,137
Patented Aug. 17, 1971

3,600,137
APPARATUS FOR THE CONTINUOUS PREPARATION OF PHTHALATE ESTERS OF GLYCOLS
Antoine Girantet, La Mulatiere, and Jean Roget and Philippe Tarbouriech, Lyon, France, assignors to Rhone-Poulenc S.A., Paris, France
Filed May 14, 1969, Ser. No. 824,585
Claims priority, application France, May 15, 1968, 151,929, Jan. 10, 1969, 6,900,301
Int. Cl. B01j *1/00*; C07c *69/82*
U.S. Cl. 23—263                          5 Claims

ABSTRACT OF THE DISCLOSURE

Apparatus for the continuous esterification of glycols with phthalic acids comprising two reactors in series, 65 to 88% of the esterification being completed in the first reactor and the remainder in the second, each reactor providing for intimate mixing of the reactants and removal of volatile products. The reactors contain a plurality of reaction zones with at least one vertical tube bundle having at least one vertical pipeline associated therewith located in each reactor, the former providing vapor risers and the latter providing liquid downcomers, thereby facilitating intimate mixing and circulation of the phases within the reactors.

---

This invention relates to the preparation of glycol phthalate esters, especially ethylene glycol terephthalate, and apparatus for use therein.

Various processes for the esterification of phthalic acids by glycols are known. They yield intermediate esters which can generally be used for the preparation of film-forming and fibre-forming linear polyesters.

French Pat. No. 1,491,074 describes a process for the esterification of terephthalic acid in two or more stages. It is carried out in laboratory autoclaves and simply enlarging these apparatuses to an industrial scale presents serious disadvantages. In fact, the mixed starting materials form a thick paste while being introduced into the reactor, and this paste is the more difficult to heat and disperse the larger is the reactor. Thus in an industrial apparatus this paste can accumulate, interfere with the regular course of the reaction, and cause local over-heating which causes the formation of considerable amounts of diethylene glycol.

The present invention provides a simple apparatus which can be used on an industrial scale and which allows direct esterification of a phthalic acid by a glycol in a molar ratio of glycol to phthalic acid of 1:1 to 2:1, and more especially of terephthalic acid by ethylene glycol, to be carried out continuously in two stages, with a high output and in good yields, as well as with reduced consumption of heat and mechanical energy. The apparatus of the present invention comprises: (I) a first reactor, adapted to operate at a pressure of less than 15 bars absolute, having: (a) a lower zone provided with a mechanical stirrer and a tube for the introduction of the phthalic acid and glycol in the immediate vicinity of the stirrer, the said stirrer being adapted to operate at a peripheral speed of 40 to 400 m./minute; (b) a middle zone provided with a bundle of vertical tubes and at least one vertical pipeline the individual cross-section of which is greater than the cross-section of one tube of the bundle, the total cross-section of the said pipeline or pipelines being between 0.2 and 1.5 times the cross-section of all the tubes of the bundle together, and the said tubes and pipelines connecting the lower and upper zones of the reactor and being provided with external heating means such that the temperature of the reaction mass can be maintained at 230° to 300° C.; and (c) an upper zone, the volume of which is such as to ensure in use a mean dwell time of the reaction mass corresponding to a degree of esterification of 65 to 88%, the upper zone being provided with a discharge tube opening out near one of the said pipelines of the middle zone and, in its upper part, with an outlet pipeline for the vapours, provided with an expension device which permits a pressure of +20% to −10% of the vapour pressure of the glycol at the working temperature to be maintained in the reactor, and optionally with external heating means; and (II) a second reactor, adapted to operate at a pressure of 0.5 to 2 bars absolute, having: (a) a lower zone consisting of a lower part topped by a bundle of vertical tubes and at least one vertical pipeline the individual cross-section of which is greater than the cross-section of one tube of the bundle, and the total cross-section of which is between 0.2 and 1.5 times the cross-section of all the tubes of the bundle together, the said tubes and pipelines being provided with external heating means and connecting the lower part of the lower zone with the middle zone of the reactor, and the discharge tube for the products coming from the first reactor (I) being arranged along the axis of a pipeline and opening out downwardly near the lower end of the latter; (b) a middle zone, the volume of which is such as to ensure in use a mean dwell time of the reaction mass corresponding to a degree of esterification of at least 90%, comprising a discharge tube; and (c) an upper zone comprising a vapour outlet connected to a rectifying column.

The invention further provides a process for the continuous preparation of a phthalate ester of a glycol, preferably operated in the apparatus just defined, which comprises feeding the glycol and phthalic acid in a molar ratio of 1:1 to 2:1 to the bottom of a first reactor, and immediately mixing them with the contents of the said reactor with heating to 230 to 300° C. at a pressure of less than 15 bars absolute so that part of the glycol and phthalic acid react with the production of water vapour, passing the foam so produced upwardly through narrow heated passages at 230 to 300° C. to an upper zone of the said first reactor at a pressure from +20% to −10% of the vapour pressure of the glycol at the temperature in the reactor, removing water vapour and glycol vapour overhead in the said upper zone, and returning the reaction mass feed of water vapour to the bottom of the reactor through at least one passage each wider than each of the said narrow passages, with the total cross-section of the wider passage or passages being betwen 0.2 and 1.5 times the total cross-section of the narrow passages, withdrawing the reaction mass from the said upper zone at a rate such that the degree of esterification of the acid in the said zone is 65 to 88%; feeding the reaction mass withdrawn from the first reactor to the bottom of a second reactor at a lower pressure of 0.5 to 2 bars absolute such that part of the reaction mass vapourizes, passing the foam so produced upwardly through narrow heated passages at 230° to 300° C. to an upper zone of the said second reactor, removing water vapour and glycol vapour overhead in the said upper zone, and returning the reaction mass feed of vapour to the bottom of the said second reactor through at least one passage each wider than each of the said narrow passages, with the total cross-section of the wider passage or passages being between 0.2 and 1.5 times the total cross-section of the narrow passages, and withdrawing the reaction mass from the said upper zone at a rate such that the degree of esterification is at least 90%.

The operation of the apparatus and process of the invention will now be described with reference to the accompanying drawings, in which:

FIG. 1 represents diagrammatically the new apparatus and its ancillary equipment;

FIG. 3 shows the second reactor, viewed in cross-section along a vertical axial plane; and FIGS. 4 and 5 represent preferred embodiments of the second reactor, viewed in cross-section along a vertical axial plane. In the drawings like numeral denote like parts throughout.

Figure 2:
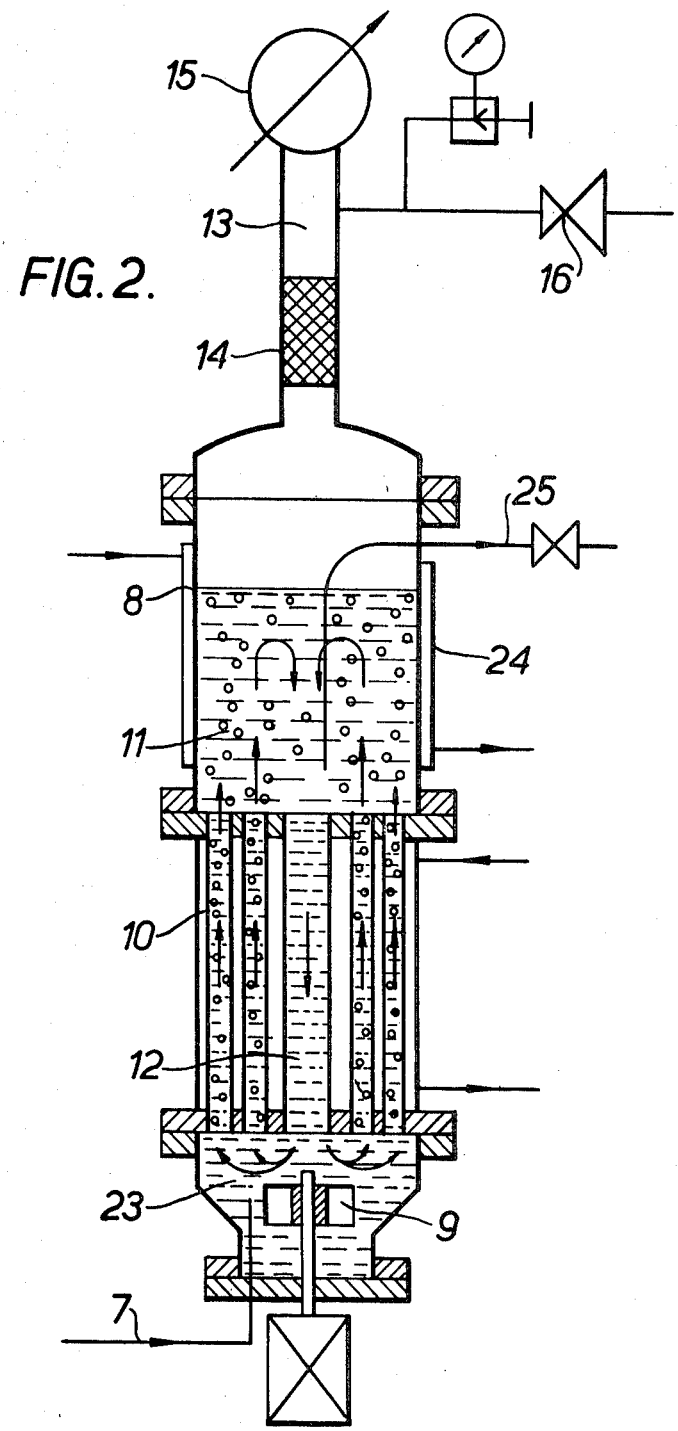
FIG. 2 shows the first reactor, viewed in cross-section along a vertical axial plane.

The new apparatus consists of a combination of two reactors. The first reactor 8 is constructed to work under an operating pressure of less than 15 bars absolute. The starting materials to be introduced into the first reactor are first mixed in a mixing apparatus 1. The latter is provided with two tubes 2 and 3 through which, for example, dry, or simply suction-dried, terephthalic acid, and ethylene glycol, are respectively introduced. A solution containing from 0.01% to 0.1% by weight, relative to the acid, of an inhibitor of the formation of ethers of glycols, preferably a glycol solution of calcium acetate, calcium propionate or triethanolamine, is introduced through the tube 4. The total amount of glycol is such that the molar ratio of glycol to acid is between 1:1 and 2:1, preferably between 1.2 and 1.7.

A stirrer 5 mixes the reagents until a homogeneous paste is formed; this is thicker, for a given ratio of glycol to acid, the finer the particle size of the terephthalic acid. A device 6, generally consisting of a volumetric pump, introduces this paste into the reactor 8 through the tube 7.

The reactor 8 consists of three superimposed zones. The lower zone 23 is provided with a mechanical stirrer 9 which produces a considerable shearing effect at its periphery, and the tube 7 which opens out in the immediate vicinity of the active part of the stirrer. The stirrer preferably consists of a turbine with radial blades, the peripheral speed of which is between 40 and 400 m./minute. The tube 7 preferably opens out in the peripheral zone of the stirrer, at a distance which is generally less than 20 cm. and preferably less than 5 cm. The bottom of the reactor preferably consists of a domed base the concave side of which faces inwards to avoid dead zones or zones which receive little stirring. The paste introduced is thus immediately dispersed into small fragments which are immediately carried away and diluted in the more fluid reaction mass. The mechanical stirrer also contributes to the active circulation of this fluid mass up to the middle zone of the reactor.

The middle zone comprises a bundle of vertical tubes 10 and at least one vertical pipeline 12 which connect together the lower 23 and upper 11 zones of the reactor. An appropriate heating fluid (for example the vapour of a eutectic mixture of diphenyl and phenyl ether) circulating outside the tubes and pipelines flows through the body of the bundle. The fluid mass circulating inside the reactor is thus heated to the desired temperature which is between 230° C. and 300° C., and preferably between 260° and 280° C. Part of the glycol and the water formed by the esterification reaction vapourises on contact with the tubes of the bundle and forms a low density foam. The column of foam formed in each tube rises in these tubes to the upper part of the bundle in the upper zone 11 of the reactor, where the vapours separate from the liquid. The latter returns to the lower part 23 of the reactor through one or more pipelines 12. The cross-sectional area of a pipeline 12 is greater than that of a tube of the bundle. The cross-sectional area of all the pipelines 12 together is between 0.2 and 1.5 times the cross-sectional area of all the tubes of the bundle together. The bundle of tubes is preferably arranged around a central pipeline. This arrangement permits a natural circulation of the fluids, and the intensity of this circulation is further increased by the action of the mechanical stirrer 9. Because of this intense circulation, which is achieved with a low expenditure of mechanical energy, excellent heat exchanges and good material exchanges are achieved. The temperature inside the reactor is uniform and the concentrations in the various parts tend to equalise. Thus the duration of the esterification is reduced, all other conditions remaining the same. Furthermore, local over-heating of the glycol is avoided and this significantly reduces the formation of diethylene glycol.

The upper zone 11 has a volume such as to ensure a mean dwell time so that the degree of esterification of the acid is 65 to 88%, and preferably 75% to 80%. The zone is topped by a column 13 where the water and glycol vapours collect. This column is optionally equipped with a spray trap 14, and a condenser 15 advantageously allows this trap to be washed with a reflux of glycol.

A device for withdrawing vapours 16 is located in the upper part of the upper zone and preferably on the column 13; it allows the pressure in the reactor to be regulated to the desired value. This pressure is generally 90% to 120% of the vapour pressure of the glycol at the reaction temperature. The expanded vapours are continuously passed into a conventional rectification column 17 between a concentration section 18 and a depletion section 19. The glycol is separated from the water of the reaction in the boiler 20 and the water is withdrawn from the head of the column at 21.

A withdrawal tube 25 is located in the upper zone 11 of the reactor at a point away from the point of introduction of the paste into the reactor, preferably in the vicinity of, and above, a pipeline 12. It allows the homogeneous liquid phase to be withdrawn when the desired degree of esterification is reached.

A device 26 which preferably consists of a volumetric pump allows the products from the reactor 8 to be withdrawn and to be introduced into a second reactor 27. The rate of withdrawal is regulated as a function of the rate of introduction of the reagents in the reactor 8 so as to maintain a particular, essentially constant level controlled by an appropriate level indicator, thus making it possible to adjust the dwell time of the products in accordance with the desired degree of esterification.

In the second reactor 27 a pressure which is generally between 0.5 and 2 bars absolute and a temperature of between 230° C. and 280° C. generally prevails. The esterification reaction is continued therein until a degree of conversion exceeding 90%, and preferably 95%, is achieved.

This second reactor 27 comprises a lower zone provided with a lower part topped by a bundle of vertical tubes 28 which are externally heated by an appropriate heating fluid (for example the vapours of a eutectic mixture of diphenyl and phenyl ethers) and at least one pipeline which connects the lower part of the lower zone with the middle zone of the reactor. The cross-sectional area of the pipeline or pipelines, which is individually greater than that of a tube of the bundle, is in total between 0.2 and 1.5 times the cross-sectional area of all the tubes of the tubular bundle together.

A natural circulation is set up through the difference in density. The products coming from the first reactor are introduced through a line 33 which is essentially axial to a pipeline, opening out near the lower end of the latter and feeding downwards so as to result in a flow in the same direction as the natural circulation of the products in the pipeline. A part of the products introduced vapourises through expansion and forms a high speed jet. The vapour thus formed rises in the tubes of the vertical bundle, increases the amount of foam normally produced and thus improves the heat exchanges and the speed of esterification without it being necessary to resort to another source of energy. The second reactor is provided with a middle zone 29 of appropriate volume which allows the product to dwell for the requisite time for its degree of esterification to exceed 90%. This zone is topped by an upper zone comprising a rectification column 30 for the vapours (consisting of water and glycol). The condenser 31 at the head of the column is, where necessary, connected to a device which maintains the desired pressure, or to a vacuum pump (not shown).

The products thus withdrawn are thereafter used in the usual way. They can for example be passed into a polycondensation installation of any known type (not shown).

Figure 5:
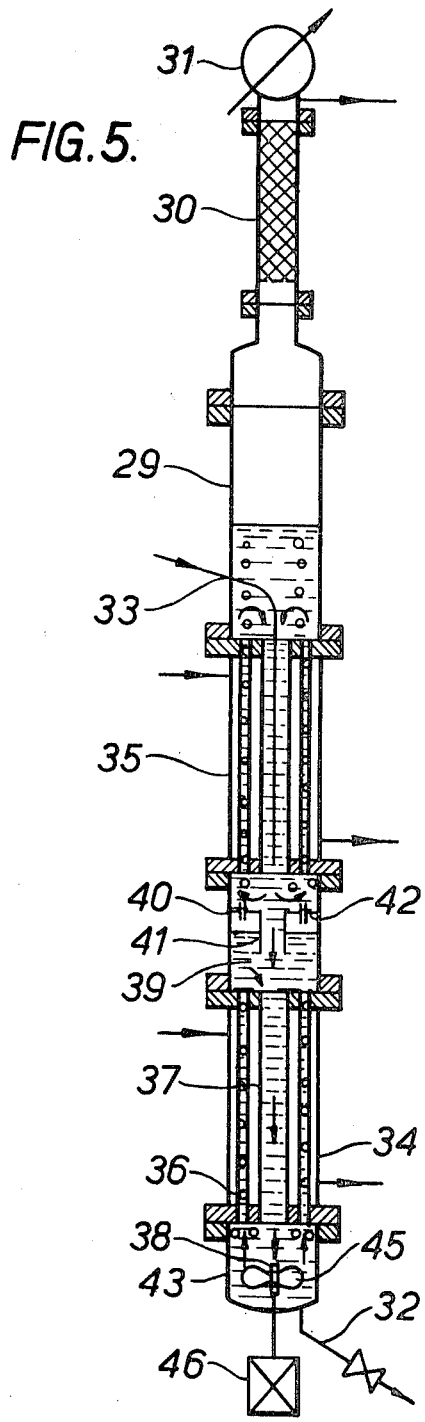

FIGS. 4 and 5 represent preferred embodiments of the second reactor. The reactor according to FIG. 4 has three superimposed zones, of which the lower zone comprises several stages. Two stages 34 and 35 have been shown. Each stage consists of a bundle of vertical tubes 36 and of at least one pipeline 37 which is externally heated by an appropriate heating fluid and which connects a lower compartment 38 to an upper compartment 39. The volume of the compartment 39 is such that the product dwells in the stage in question for the requisite time for obtaining the desired degree of esterification. Two consecutive stages are separated by a horizontal partition 40 comprising a tube 41 which extends under the partition along the axis of the pipeline 37, as well as apertures 42 arranged along the upper axis. Separate passages for the liquid and vapour phases are thus obtained. The reactor possesses a base 43 provided with a discharge tube 44. It furthermore possesses a tube 33 opening at the base of the lower stage for introducing the products coming from the preceding reactor (not shown) and a tube 32 for removing the esterified products either by an overflow or by any appropriate removal device. Two to eight stages and preferably two to four stages are generally employed.

Such a reactor functions as follows: Part of the reaction mass introduced at the bottom of the apparatus vapourises through release of pressure, and the vapour thus formed rises in the tubes of the bundle, and produces an active circulation of the liquid phase within this stage through the difference in density; the liquid is returned through the pipeline 37. The liquid and vapour phases rise in co-current relationship towards the upper stage and separately pass through the partition 40. The circulation of the liquid and vapour phases and the exchange conditions are similar in the upper stage to those obtained in the lower stage. The degree of esterification increases from one stage to the next and at the top of the zone of stages' the products which have reached the desired degree of esterification are withdrawn. The water vapour and glycol vapour reach the upper zone of the reactor and are there distilled.

FIG. 5 represents a different embodiment of the same kind of reactor. At the bottom of the upper stage the apparatus is equipped with a tube 33 for introducing products arising from the preceding reactor, and at the bottom of the apparatus a tube 32 for withdrawing the esterified products is provided. A stirrer 45 driven by a motor 46 is provided at the bottom of the apparatus or, where appropriate, at the bottom of the lower stages.

Part of the products introduced vapourises through expansion and produces vigorous circulation in the upper stage. The liquid phase then descends to the lower stage where it is vigorously driven along by the stirrer. On contact with the tubes of the bundle, the water and glycol which have not yet been removed form vapours which rise in counter-current relationship to the liquid phase. Inside each stage of the reactor, a uniform temperature of between 230 and 280° C. is maintained. The stages can be maintained at different temperatures but if desired they can all be operated at the same temperature.

It is surprisingly found that on working with such a combination of reactors, with the liquid and vapour phases flowing through the last reactor either in counter-current or in rising co-current relationship, the productivity of the apparatus is very considerably increased whilst preserving the excellent quality of the product obtained.

The apparatus described can be varied in different ways. Thus it is possible to use an intermediate reactor. The vapours of water and of glycol which are evolved during the reaction can also, if desired, be rectified under pressure.

The operation of the new apparatus and process is not limited to the esterification of terephthalic acid by ethylene glycol. It can be applied to other esterifications between phthalic acids and various glycols.

The following examples illustrate the invention.

EXAMPLE 1

The apparatus is that shown schematically in FIGS. 1–3. The continuous mixer 1 is a cylindrical vat with a conical bottom, of 9.5 litres capacity, provided with a helical stirrer. The devices 6 and 26 are gear pumps. The first reactor 8 is a vertical column of 225 mm. diameter having a truncated cone bottom, equipped with a centrifuge turbine 9 of 150 mm. diameter and having 2 rectangular radial blades, with a peripheral speed of 140 m./minute, and driven by an 0.33 horsepower motor. The reagents are introduced through a lateral tube of internal diameter 12 mm. opening out 3 cm. from the turbine. The tubular bundle 10 consists of 24 tubes of 20 mm. internal diameter arranged around a central tube of 70 mm. diameter. The height of the bundle is 600 mm. It is topped by a cylindrical section of 540 mm. height, provided with a double jacket for heating. The top of the reactor consists of a column of 70 mm. diameter and 540 mm. height provided with a plug 14 consisting of a knitted metal fabric and topped by a condenser of 3 dm.$^2$ surface area. The second reactor consists of a column of 160 mm. diameter comprising 3 superimposed sections; the lower zone comprises a bundle of tubes of 400 mm. height, consisting of 6 tubes of internal diameter 29 mm. arranged around a central chimney of 50 mm. diameter into which dips the tube for the introduction of the products coming from the reactor. In the centre, the middle zone is cylindrical and of 400 mm. height. The top comprises a distillation column of 70 mm. diameter and 500 mm. height, packed with a knitted metal fabric and topped by a condenser of 13.5 dm.$^2$ surface area. 18.2 kg. of terephthalic acid of particles size between 20$\mu$ and 100$\mu$, and a solution of 9.38 g. of calcium acetate monohydrate in 10.5 kg. of ethylene glycol are mixed hourly. The molar ratio of glycol to terephthalic acid is 1.55:1. The resulting paste is continuously introduced at this rate into the first reactor by means of the gear pump 6. The reaction mass occupies a volume of 25.8 litres therein. The paste is dispersed immediately after its introduction in the reaction mass, which is kept under an absolute pressure of 6 bars and at a temperature of 270° C. The vapours are removed continuously and 3.38 kg./hour of water and 2.5 kg./hour of glycol are obtained by rectification. 22.8 kg./hour of a product in which the degree of conversion of the terephthalic acid reaches 85.7% are withdrawn continuously from the reactor.

This product is introduced into the second reactor by means of the gear pump 26. It is passed to the bottom of the central pipeline of the bundle of tubes. The pressure in the reactor is kept at atmospheric pressure and the temperature at 250° C. The reaction mass occupies a volume of 10 litres. Water containing a little glycol is withdrawn at the head of the column which tops the second reactor, at a rate of 0.44 kg./hour. The esterified products are withdrawn through an overflow at a rate of 22.3 kg./hour. The total dwell time is 1 hour 30 minutes under these conditions. The degree of conversion of the terephthalic acid is 94.8%. The diethylene glycol content of the final product is only 1% by weight. This product yields a polymer of excellent quality.

EXAMPLE 2

The procedure of Example 1 is followed, using the same apparatus. 18 kg. of terephthalic acid (of the same particle size as in Example 1) and 3.60 g. of triethanolamine dissolved in 10.38 kg. of ethylene glycol are used hourly. The ratio of glycol/terephthalic acid is 1.54:1. The reaction mass occupies a volume of 17.8 litres in the first reactor. 3.40 kg./hour of water and 1.7 kg./hour of glycol are obtained by rectification. 23 kg./hour of a product in which the degree of conversion of the terephthalic acid reaches 87.1% are withdrawn from the reactor. This product is introduced into the second reactor. 0.53 kg./hour of water containing a little glycol are withdrawn at the head of the column topping the second reactor. The total dwell time of the product to be esterified is 1 hour 12 minutes under these conditions. The degree of conversion of the terephthalic acid is 94.7%. The diethylene glycol content of the final product is only 0.8% by weight.

By way of comparison, the coefficient of heat transmission in the bundle of tubes of the first reactor was determined and was found to be k=300 Kcal./m.$^2$.hour.° C. In a discontinuous operation in a conventional autoclave provided with a helical blade stirrer and a double heating jacket, the coefficient of transmission is only about 100 Kcal./m.$^2$.hour.° C. at the beginning of the reaction, thus demonstrating the efficiency of the apparatus according to the invention.

EXAMPLE 3

The same apparatus as that described in Example 1 is used, except for the last reactor. This reactor, shown in FIG. 5, is identical to the corresponding reactor used in Example 1 except for the lower part, with the bottom being replaced by an additional stage. This additional stage consists of the following three elements from bottom to top: the bottom, equipped with a discharge tube and a turbine with a peripheral speed reaching 1.1 m./second; the bundle of tube 34 identical to the bundle 35; and, between these two bundles, a cylindrical section of 200 mm. height equipped with a horizontal partition provided with 6 apertures of 4 mm. diameter and a central tube of 20 mm. diameter and 80 mm. height.

31 kg. of terephthalic acid of particle size between 20 and 100µ are mixed hourly with 17.9 kg. of ethylene glycol, the glycol containing 0.8925 g. of calcium acetate monohydrate per kg. The molar ratio of glycol to terephthalic acid is 1.54:1. The resulting paste is continuously introduced into the first reactor, in which the reaction mass has a volume of 25.8 litres. The temperature is kept at 277° C. and the pressure at 7 bars absolute. 5.56 kg./hour of water and 3.24 kg./hour of glycol are obtained by rectification of the vapours. 40.1 kg./hour of a product in which the degree of conversion of the terephthalic acid reaches 82.8% are withdrawn continuously.

This product is introduced into the last reactor in which the reaction mass has a volume of 16.5 litres. It is expanded to atmospheric pressure at the bottom of the upper bundle 35. A constant temperature of 250° C. is maintained in the whole of this reactor by means of a mixture of vapours of diphenyl and of phenyl ethers. 1.1 kg./hour of water containing a little glycol is withdrawn at the head. At the bottom of the reactor 39 kg./hour of esterified products are withdrawn. Under these conditions the total dwell time is 1 hour and 3 minutes. The degree of conversion of the terephthalic acid is 94.6%. The diethylene content of the final product is only 0.89% by weight. This product yields a polymer of excellent quality.

It is found that under these conditions, which are similar to those observed in Example 1, with the temperature of the latter reactor in particular remaining the same, a product of at least equal quality (in which the diethylene glycol content is even less) is obtained with an equivalent degree of conversion of the terephthalic acid. It is furthermore found that at the cost of an increase of 18% in the volume of the apparatus, the hourly production increases by 67%. The hourly production per unit of volume, that is to say the productivity of the whole apparatus, thus rises by 42%, and this is a particularly noteworthy result.

EXAMPLE 4

The same apparatus as in the preceding example is used, except for the last reactor which is modified as shown in FIG. 4.

32 kg. of terephthalic acid of particle size between 20 and 100µ are mixed hourly with 17.9 kg. of ethylene glycol, the glycol containing 0.8925 g. of calcium acetate monohydrate per kg. The molar ratio of glycol to terephthalic acid is 1.50:1. The first reactor is operated as in the preceding example, the temperature thus being maintained at 275° C. and the pressure at 6.6 bars absolute. 41.1 kg./hour of a product in which the degree of conversion of the terephthalic acid reaches 83.3% are withdrawn.

This product is introduced into the last reactor, in which the reaction mass has a volume of 16.7 litres. The mass is expanded to atmospheric pressure at the bottom of the apparatus. The temperatures of the initial stage and of the final stage are respectively controlled to 250° C. and 260° C. At the head of the column 1.47 kg./hour of water containing a little glycol are withdrawn, and 39.6 kg./hour of esterfied products are withdrawn through an overflow. Under these conditions the total dwell time is 1 hour 3 minutes. The degree of conversion of the terephthalic acid is 95.2% and the diethylene glycol content of the final product is only 0.90% by weight. This product yields a polymer of excellent quality.

If reference is made to Example 1, it is found that with the fiinal temperature being slightly higher at the reactor outlet, a product of lower diethylene glycol content is obtained, with a very slightly improved degree of conversion of the terephthalic acid. For an increase in volume of the apparatus of 19%, the hourly production is increased by 70% and the productivity of the apparatus by 43%.

We claim:
1. Apparatus for the continuous preparation of a glycol phthalate by direct esterification of a phthalic acid by a glycol in a molar ratio of glycol to phthalic acid of between 1 and 2, comprising: (I) a first reactor, adapted to operate at a pressure of less than 15 bars absolute, having (a) a lower zone provided with a mechanical stirrer and a tube for the introduction of the phthalic acid and glycol in the immediate vicinity of the stirrer, the said stirrer being adapted to operate at a peripheral speed of 40 to 400 m./minute; (b) a middle zone provided with a bundle of vertical tubes and at least one vertical pipeline the individual cross-sectional area of which is greater than the cross-sectional area of one tube of the bundle, the total cross-sectional area of the said pipeline or pipelines being between 0.2 and 1.5 times the cross-sectional area of all the tubes of the bundle together, and the said tubes and pipelines connecting lower and upper zones of the reactor and being provided with external heating means such that the temperature of the reaction mass can be maintained at 230°C. to 300° C., and (c) an upper zone, the volume of which is such as to ensure in use a mean dwell time of the reaction mass corresponding to a degree of esterification of 65 to 88%, the upper zone being provided with a discharge tube opening out near one of the said pipelines of the middle zone and, in its upper part, with an outlet pipeline for the vapours, provided with an expansion device which permits a pressure of 90% to 120% of the vapour pressure of the glycol at the working temperature to be maintained in the reactor; and (II) a second reactor, adapted to operate at a pressure of 0.5 to 2 bars absolute, having: (a) a lower zone consisting of a lower part topped by a bundle of vertical tubes and at least one vertical pipeline the individual cross-sectional area of which is greater than the cross-sectional area of one tube of the bundle, and the total cross-sectional area of which is between 0.2 and 1.5 times the cross-sectional area of all the tubes of the bundle together, the said tubes and pipelines being provided with external heating means and connecting the lower part of the lower zone with a middle zone of the reactor, and the discharge tube for the products coming from the first reactor (I) being arranged along the axis of one of said pipelines and passing therethrough and opening out down- wardly near the lower end of the latter; (b) a middle zone, the volume of which is such as to ensure in use a mean dwell time of the reaction mass corresponding to a degree of esterification of at least 90%, comprising a discharge tube; and (c) an upper zone comprising a vapour outlet connected to a rectifying column.

2. Apparatus according to claim 1 in which the upper zone of the first reactor is provided with external heating means.

3. An apparatus according to claim 1 wherein the reactor (II) is provided with mechanical stirring means at its bottom.

4. Apparatus according to claim 1 wherein the reactor (II) is a multistage reactor.

5. Apparatus according to claim 4 wherein the reactor (II) has a lower zone (a) consisting of 2 to 8 stages, each stage being provided with external heating means and comprising a bundle of vertical tubes and at least one vertical pipeline as previously defined, connecting lower and upper compartments, with the volume of each upper compartment being such as to ensure in use a mean dwell time corresponding to the degree of esterification required; each stage being separated from the stage immediately above by a horizontal partition provided with apertures arranged along the axes of the tubes of the stage immediately above, and with at least one tube extending under the partition along the axis of the vertical pipeline of the said lower stage.

References Cited
UNITED STATES PATENTS

| | | | |
|---|---|---|---|
| 2,474,592 | 6/1949 | Palmer | 23—285X |
| 2,507,105 | 5/1950 | Howard et al. | 23—285X |
| 3,507,905 | 4/1970 | Girantet et al. | 260—475(P) |
| 3,511,615 | 5/1970 | Roget et al. | 23—260X |

FOREIGN PATENTS

| | | | |
|---|---|---|---|
| 567,645 | 12/1958 | Canada | 23—285 |
| 1,491,074 | 6/1967 | France | 23—285 |

MORRIS O. WOLK, Primary Examiner

B. S. RICHMAN, Assistant Examiner

U.S. Cl. X.R.

23—260, 283, 285; 260—475